(12) United States Patent
Ueda

(10) Patent No.: US 7,058,684 B1
(45) Date of Patent: Jun. 6, 2006

(54) DEVICE, METHOD, AND STORAGE MEDIUM TO BLOCK JUNK EMAIL

(75) Inventor: Haruyasu Ueda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/577,594

(22) Filed: May 25, 2000

(30) Foreign Application Priority Data

May 27, 1999 (JP) ................................ 11-147680

(51) Int. Cl.
*G06F 15/16* (2006.01)
(52) U.S. Cl. ................................... 709/206
(58) Field of Classification Search ............... 709/206, 709/203, 207
See application file for complete search history.

(56) References Cited

U.S. PATENT DOCUMENTS

| 5,377,354 | A |   | 12/1994 | Scannell et al. ............ 709/103 |
| 5,619,648 | A |   | 4/1997  | Canale et al. ............... 709/206 |
| 5,765,033 | A | * | 6/1998  | Miloslavsky ................ 709/206 |
| 6,460,050 | B1 | * | 10/2002 | Pace et al. ................ 707/104.1 |
| 6,546,416 | B1 | * | 4/2003  | Kirsch ......................... 709/206 |
| 6,591,291 | B1 | * | 7/2003  | Gabber et al. .............. 709/206 |

FOREIGN PATENT DOCUMENTS

| JP | 10-322384 | 12/1998 |
| WO | 98/18249 | 4/1998 |

OTHER PUBLICATIONS

"The SPAM-L FAQ—Blocking Spam (Version 3.13)" http://www.claws-and-paws.com/spam-1/blocking.html.
Yahoo! Web pages describing AddressGuard printed Mar. 12, 2004, 4-pp.

* cited by examiner

*Primary Examiner*—David Y. Eng
(74) *Attorney, Agent, or Firm*—Staas & Halsey LLP

(57) ABSTRACT

A server which delivers emails can receive emails addressed to a plurality of transmission destinations including portions that can be arbitrarily determined by a user as a transmission destination of each user. Upon receipt of email from a transmission line, the server extracts the transmission address from the email in a mail accepting unit, and makes a matching between the extracted address and the addresses or address patterns stored in a table within a processing contents storing unit. If they mismatch, the server performs normal mail processing for the user. If they match, the server performs the operations such as destroying the email, returning an error mail message, putting a mark on a predetermined area in the email, or adding a transmission destination address depending on the property of the email. If an encrypted pattern is included in the address, the server performs processing according to the command obtained by decrypting the pattern.

7 Claims, 13 Drawing Sheets

| ADDRESS OR PATTERN | PROCESSING METHOD | OPTION |
|---|---|---|
| | DISCARDING | NONE |
| | | |

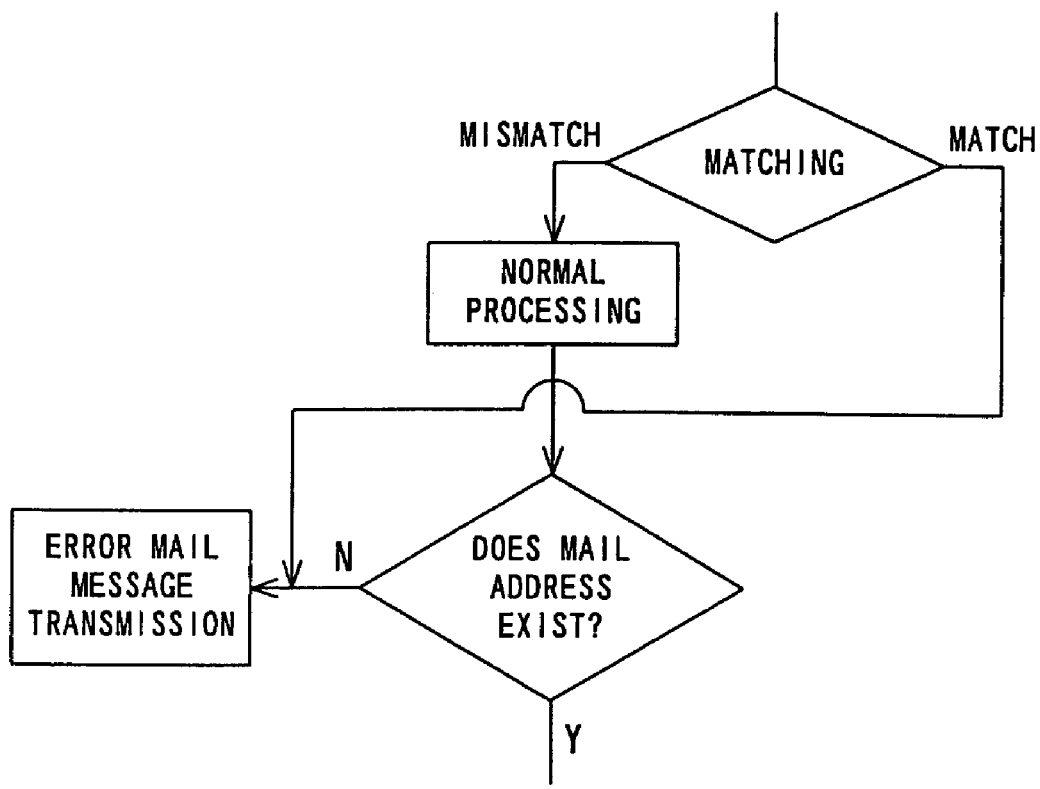
F I G. 3A
F I G. 3B
| ADDRESS OR PATTERN | PROCESSING METHOD | OPTION |
|---|---|---|
|  | ERROR MAIL TRANSMISSION | NONE |
|  |  |  |

| ADDRESS OR PATTERN | PROCESSING METHOD | OPTION |
|---|---|---|
| | PUTTING MARK | MARK PUTTING METHOD |
| | | |

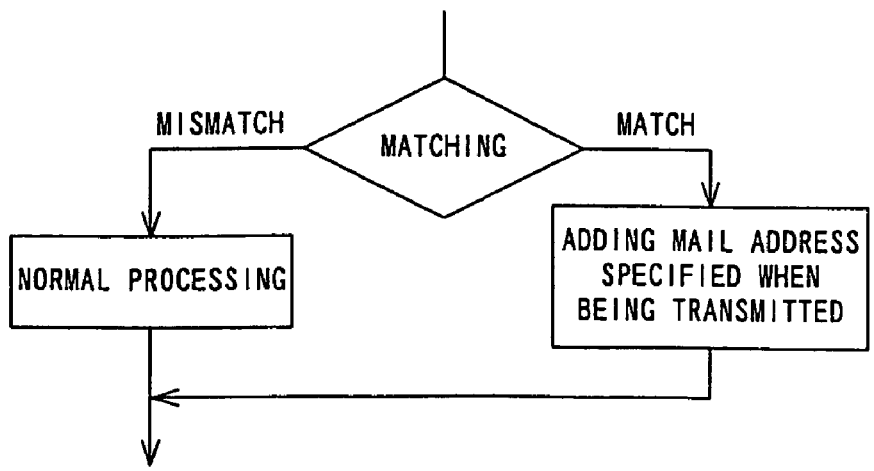
FIG. 5A
| ADDRESS OR PATTERN | PROCESSING METHOD | OPTION |
|---|---|---|
|  | ADDING TRANSMISSION DESTINATION | NONE |
|  |  |  |
FIG. 5B
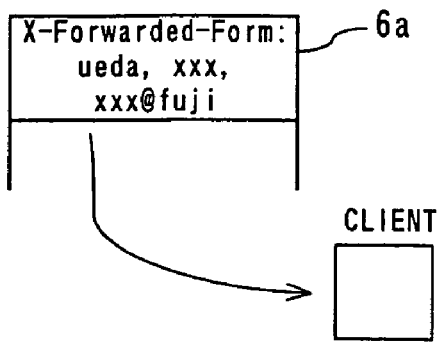
FIG. 5C

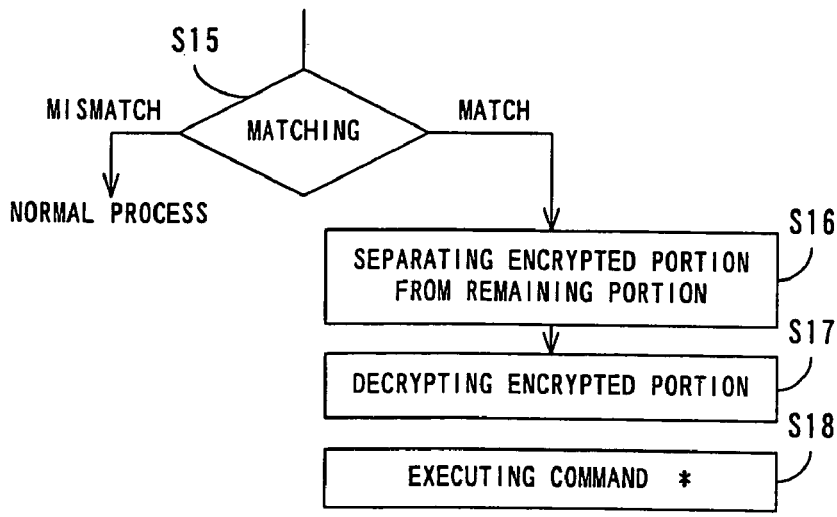

FIG. 8A

| USER | KEY |
|------|-----|
|      |     |

| ADDRESS OR PATTERN | PROCESSING METHOD | OPTION |
|--------------------|-------------------|--------|
|                    | EXECUTING ENCRYPTED COMMAND | ENCRYPTED PORTION EXTRACTION PATTERN ** |
|                    |                   |        |

FIG. 8C

* ALLOWING ANY OR ALL OF FOLLOWING INFORMATION ITEMS
  TO BE REFERENCED DURING EXECUTION
  -MAIL MESSAGE (HEADER AND TEXT)
  -EXTRACTION PATTERN
  -MAIL ADDRESS

** ENCRYPTED PORTION EXTRACTION PATTERN MAY BE SPECIFIED
   AND SORTED NOT AS OPTION BUT AS PART OF ADDRESS PATTERN

| ADDRESS OR PATTERN | PROCESSING METHOD | | OPTION | |
|---|---|---|---|---|
| | ENCRYPTION COMMAND | ENCRYPTED PORTION EXTRACTION PATTERN | KEY | |
| | | | | |

| ADDRESS OR PATTERN | PROCESSING METHOD | | | OPTION |
|---|---|---|---|---|
| | PATTERN (INCLUDING ENCRYPTED PORTION EXTRACTING METHOD) | ENCRYPTION COMMAND | KEY | |
| | | | | |

FIG. 13

DEVICE, METHOD, AND STORAGE MEDIUM TO BLOCK JUNK EMAIL

BACKGROUND OF THE INVENTION

1. Field of the Invention

The present invention relates to email, particulary, to a blocking method and a blocking apparatus for junk email.

2. Description of the Related Arts

Nowadays, the Internet has become popular, and a large amount of information is exchanged over the Internet. The information exchange includes conventional information exchange using email in addition to information publication on home pages. Today, however, an email address of an individual is leaked to an unexpected person, and many unsolicited email messages can reach the address. Conventionally, email software must be used as a measure to block harmful advertising or junk email, which is referred to as spam. With such a spam blocking method, it is possible to detect character strings which frequently appear in spam messages, or to filter email sent from particular email addresses. However, U.S. Pat. No. 5,619,648 providing such a method is not a complete solution, and spam transmission tricks become complex more and more, which leads to a vicious spiral.

Additionally, email that is desired to be received can possibly be deleted if it is mistakenly identified as spam and cannot be read, although such a case is rare. Namely, email messages including the same character string can be, for example, both sides about an issue expressed by that character string. Therefore, limitations naturally exist in the determination of whether or not received email is desired mail according to the detection of a character string.

Furthermore, since opportunities to notify others of an email address are increasing, it is almost impossible to determine from where an email address is known to a spammer. That is, today, individuals frequently set up home pages, and make information public. To clarify where the responsibility for the information carried on a home page rests, the mail address of the person who sets up the home page with the information is made public. In such a case, whoever views the mail address is not known on a worldwide scale, and the possibility that junk mail is transmitted from an unknown person has been increasing.

Since the method for processing email is already known, its detailed explanation is omitted in the following description. For the details of the method for processing email, please see, by way of example, "Sendmail (Nutshell Handbook)" written by Brayan Costales & Eric Allman, published by O'Reilly & Associates, Inc., 1997, or RFC (Request For Comments) distributed by the Network Information Center (NIC).

Also in a conventional system, it is possible to change the email address of an individual when the address is proved to be a spam target. However, in the conventional system, a single address is assigned to a single person, and also a charge is fixed per address in many cases. Therefore, it is difficult to change a contract with an Internet service provider, a normally used email address, or an address notified to other persons, each time spam harm occurs. This is, therefore, not a practical method.

Furthermore, since the cost on an email transmitting side is low, a huge pieces of email can be sent if only email addresses are known. Therefore, it is easy to simultaneously transmit a spam message to email addresses collected by some means or another from somewhere. Spam is a serious problem not only in countries, such as the U.S., where the popularity of the Internet is high, etc., but also in Japan.

SUMMARY OF THE INVENTION

An object of the present invention is to provide a device and a method which can block the reception of junk email.

A device in a first aspect of the present invention is a device blocking junk emails. The device comprises: a mail address extracting unit extracting a mail address from received email; a registering unit registering a processing method for the received email in correspondence with particular mail address or address patterns; and a mail processing unit making a matching between the address of the received email and the mail addresses or address patterns registered in the registering unit, and processing the received email based on the processing method obtained as a result of the matching.

A device in a second aspect of the present invention is a device receiving emails from an email server which has a receiving unit receiving emails, and an adding unit adding a transmission source address to all of received emails. This device comprises a unit interpreting the transmission source address included in received email, and setting the processing method for a particular mail address or an address pattern.

A method in the first aspect of the present invention is a method blocking junk emails. This method comprises the steps of: (a) extracting a mail address from received email; (b) registering the processing method for the received email in correspondence with a particular mail address or an address pattern; and (c) making a matching between the mail address of the received mail and the mail addresses or address patterns registered in the step (b), and processing the received email based on the processing method obtained as a result of the matching.

A method in the second aspect of the present invention is a method receiving emails from an email server which has a receiving unit receiving emails, and a unit adding a transmission source address to all of received emails. This method comprises the step of interpreting the transmission source address included in received email, and setting the processing method for a particular mail address or an address pattern.

According to the present invention, it is possible, with a simple method, to create a disposable mail address, a mail address dedicated to a particular partner, or a mail address including encrypted information that is understandable only by a recipient on an email server side or on a client side receiving emails from an email server. Accordingly, it is possible to easily determine emails from an unexpected transmitter, and to receive only desired emails.

BRIEF DESCRIPTION OF THE DRAWINGS

FIGS. 3A and 3B show the processing of the server and a table stored in a processing contents storing unit when the address or address pattern of received email matches a predetermined address or address pattern, and the email is rejected by transmitting an error mail message;

FIGS. 5A through 5C exemplify the processing contents, a table, and processing, when the server delivers email as usual, and adds the address of the incoming email to the message;

FIGS. 8A through 8C show the processing of the server and stored data, when a processing method is encrypted and buried in an arbitrary character sting in an email address, and the server interprets the encrypted characters and executes the method (No. 1);

FIG. 13 exemplifies the format in which a client program inquires of a user as to a field name or date.

DESCRIPTION OF THE PREFERRED EMBODIMENTS

Figures 1A, 1B:
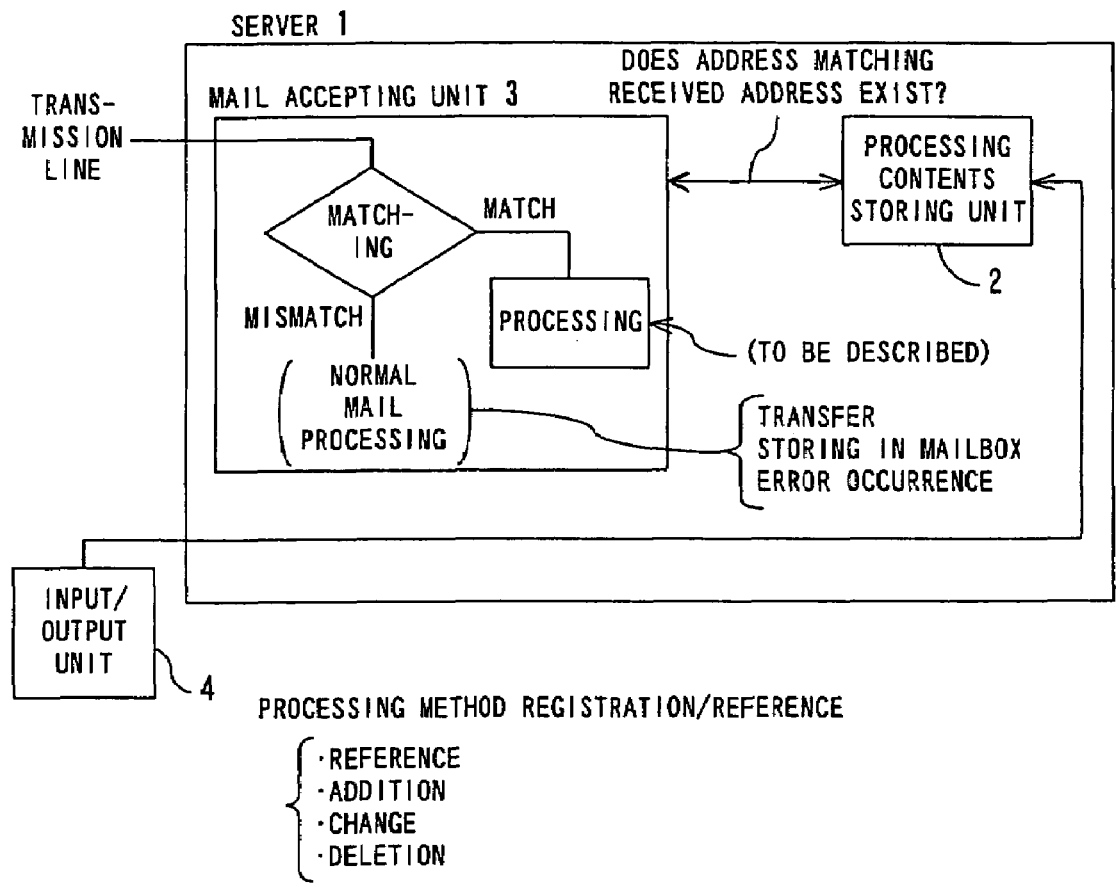
FIGS. 1A and 1B show a first preferred embodiment according to the present invention.

FIGS. 1A and 1B show a first preferred embodiment according to the present invention.

FIG. 1A shows the functional configuration of a server.

A mail transfer server (hereinafter referred to as a server 1) transmits all of emails having addresses in a predetermined format to a particular person. Assuming that the email has the following address formats.

ueda@xxxxx.server.com or, ueda.xxxxx@server.com

The email having the above described formats including arbitrary "xxxxx" are transmitted to a preregistered email address, or delivered to a preregistered mailbox.

If a character string having an arbitrary length is permitted in the portion "xxxx", it is theoretically possible to set an unlimited number of email addresses. Also, if a character string having a sufficiently long fixed-length is permitted, the email can be delivered from many addresses to one mailbox.

Therefore, a user can easily reject and delete the email transmitted to an address which does not include "xxxxx" that the user predetermines to accept email.

For normal use according to the present invention, an email user notifies persons who can possibly transmit emails to the user of his or her different addresses. Email which reaches an address other than the notified addresses may be discarded or ignored.

In this way, if a certain email address is proved to be a spam target, it is sufficient not to use the email address used so far. Furthermore, it can be proved that the person who should transmit email to this address is a spammer, or leaks the address to a spammer.

In addition, suppose that an individual must make his or her own address public in order to clarify where a responsibility rests, for example, at the time of carrying news on a home page. In this case, an email address that is different for each reply mail is used, and only reply mail including a particular keyword is accepted, so that it becomes impossible to transmit spam even if email addresses which are known as described above are collected.

Assume that a user preregisters the address of email to be received to a server 1, and obtains the address of his or her own as a transmission destination of the email. Here, this email address is assumed to be [name@server].

The server 1 performs either of the following operations so as to prepare an unlimited number of email addresses.

1) Handling all email addressed to [name.arbitrary character string@server] as those addressed to [na me@server] by using characters (such as [.]) unused in the name portion, and re-delivering them or dropping them into a mailbox.

2) Notifying worldwide that the server 1 receives the email addressed to [name@arbitrary domain name.server] by using an MX (Media eXchange) field of a Domain Name Service. Handling all of received email as those addressed to [name@server], and re-delivering them or dropping them into a mailbox on demand.

Furthermore, after the server 1 makes a matching of the address or the address pattern of received email in a mail accepting unit 3, it performs the operations such as destroying the email, rejecting the email by transmitting an error mail message, adding some field that can be processed by user mail reader software, or the like according to a user instruction given in advance, when re-delivering the email or dropping it into a mailbox. The operation for adding some field allows a user to easily ignore or destroy the email, or to assign a lower priority when reading the email, for example, by using the device disclosed by U.S. Pat. No. 5,377,354.

A user possesses all or at least one of the following means for performing the following operations when issuing an instruction to the server 1.

Specifying a particular email address and its processing method, so that the server 1 processes the email reaching the specified address with the specified method.

Specifying a particular address pattern and its processing method, so that the server 1 processes the email reaching the address which matches the pattern with the specified method.

Specifying a processing method for all of emails addresses, so that the server 1 processes all of email with the specified method.

To implement the above described operations, a processing contents storing unit 2 storing a specified address and its corresponding processing method as a pair is arranged within the server 1. FIG. 1B exemplifies a table stored in the processing contents storing unit 2. Each line in this table 2a is composed of a field for storing an address or an address pattern, a field for storing the processing method corresponding to the address or the address pattern, a field for storing an option such as a parameter used in the processing method, etc. The server 1 makes a matching between the address of incoming email and the addresses or the address patterns registered to the table 2a. If a matching address or address pattern exists in the table 2*a*, the server 1 performs the processing corresponding to the matching address or address pattern. If a processing method is specified for all of emails addresses, the server 1 processes all of emails addressed to the user with the specified method.

Additionally, the server 1 comprises an input/output unit 4 through which a user registers/references a processing method. When a user makes a request to reference a processing method list through the input/output unit 4, the server 1 presents to the user the list of all processing methods corresponding to the name of the user (including address patterns and options). Furthermore, when the user registers a processing method through the input/output unit 4, the server 1 performs the following operations.

Deleting previous registration.
Changing registered contents.
Making new registration.

The search order of address patterns is endowed with a meaning, so that it becomes possible to execute processing without ambiguity by preferentially using a pattern which matches earlier if a plurality of address patterns match one destination. Namely, specification is made to make a matching range narrower. Consequently, an exceptional pattern or a general pattern can be specified later. In this case, the server 1 is configured to accept also a request to change the order of a registered processing method (in which order the corresponding pattern is examined), which is input by a user through the input/output unit 4.

Or, the server 1 may be configured to reject registration or to select and process one processing method which suitably matches, if an address pattern is ambiguous/the reliability of the email is low.

Figures 2A, 2B:
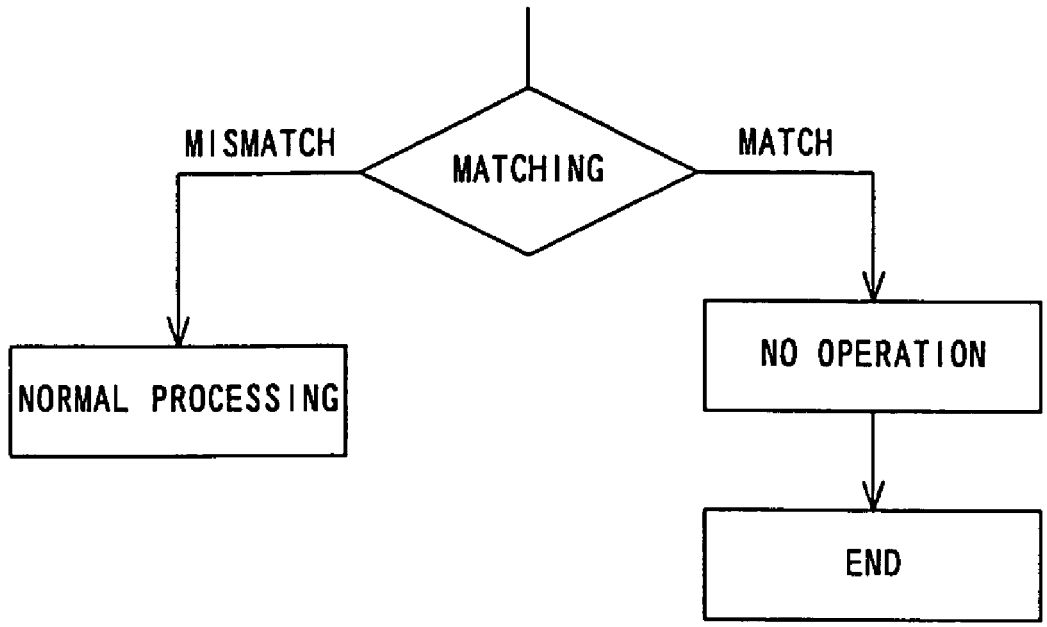
FIGS. 2A and 2B exemplify the processing method performed by a server if the reliability of received email is low.

FIGS. 2A and 2B exemplify the processing performed when the order of the search which is made by the server 1 having the above described configuration is endowed with a meaning.

If the reliability of email is low as a result of the matching of its address or address pattern, which is made in the mail accepting unit 3 when the server 1 receives the email, the server 1 performs particular processing. FIG. 2A shows the processing performed by the mail accepting unit 3 within the server 1 upon receipt of the email.

The serve 1 performs either or both of the following operations as a processing method.

Making a delivery as usual.
Making no delivery.

When email reaches the address for which no delivery is made as a processing method, the server 1 performs no operations.

FIG. 2B exemplifies the contents of the table 2*a* stored in the processing contents storing unit 2 in the above described case.

In this case, a particular address or address pattern is stored in an address or address pattern field, and a processing content "discarding" is registered to the corresponding processing method field. No specification is made in an option field. Upon receipt of email the processing content of which is registered to the table 2*a* shown in FIG. 2B, the server 1 references this table 2*a*, reads the corresponding processing method, and performs the operation "discarding" for the received email. Actually, if the server 1 does not deliver the email and performs no operations, the email will automatically disappear from a mailbox.

FIGS. 3A and 3B respectively show the processing that the server 1 performs so as to reject email by transmitting an error mail message, if the address or the address pattern of the received email matches a predetermined address or address pattern, and show the contents of the table 2*a* stored in the processing contents storing unit 2 in such a case.

FIG. 3A shows the processing performed by the mail accepting unit 3 within the server 1.

If the address or the address pattern of incoming email matches a particular address or address pattern registered to the table 2*a*, the server 1 creates an error mail message in a similar manner as in the case where a normal unknown destination address is found, and transmits the created message to the transmission source of the email (error mail message transmission)

An error mail message is created in a similar manner as in the case where an error actually occurs during the transmission/reception of the email. The created message is returned to a transmission source upon receipt of the email suspected to be spam. Therefore, a spammer is made to feel, for example, as if the email destination address were wrong.

FIG. 3B exemplifies the contents of the table 2*a* stored in the processing contents storing unit 2 within the server 1 for the implementation of the above described error mail message transmission processing.

For a particular address or address pattern, an "error mail message transmission" is registered as a processing method. In this example, no specification is made in the option field. However, options of words included in an error message may be registered, and any of the options may be selected and used when an error message is generated.

Figure 4A:
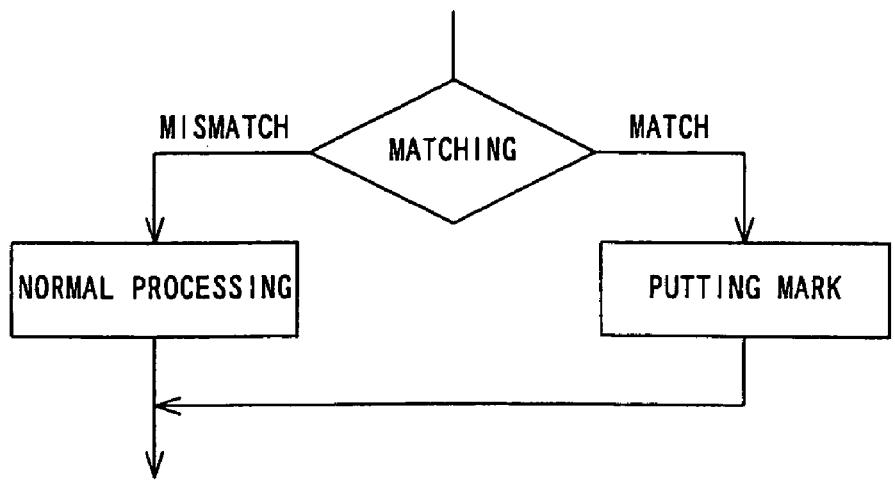
FIGS. 4A through 4C exemplify the processing of a mail accepting unit, and a table and a mark of a processing method storing unit, when a server delivers an email message as usual, and puts a specified mark on the message.
Figure 4B:
Figure 4C:
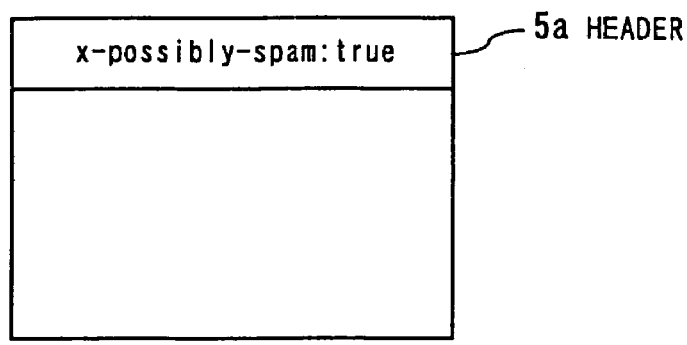

FIGS. 4A through 4C exemplify the processing performed by the mail accepting unit 3, the contents registered to the table 2*a* within the processing method storing unit 2, and how to put a mark, when the server 1 delivers email as usual, and puts a specified mark on the email message.

FIG. 4A shows the processing performed by the mail accepting unit 3 within the server 1.

When "putting a mark" is specified as a processing method, which mark to be put is specified by a user. The specified mark is stored as a processing method option of the server 1 in the processing contents storing unit 2. Accordingly, as shown in FIG. 4B, in the table 2*a* stored within the processing contents storing unit 2, adoption of the processing method "putting a mark on email" is registered, and at the same time, a mark putting method (information of which message to be added) is registered to the option field, in correspondence with a particular address or address pattern.

When the email reaches the address corresponding to this processing method, the server 1 delivers the email similar to normal email after putting a specified mark on the mail.

FIG. 4C exemplifies how to put a mark.

This figure shows the example where a mark "X-possibly-spam:true" is put on a header 5*a* of email 5. With such a mark, a user can determine whether or not incoming mail is spam. Additionally, spam mail may be destroyed based on the mark. For the way of putting a mark, please see the documents cited in the explanation of the conventional techniques. Their explanations are therefore omitted here.

FIGS. 5A through 5C exemplify the processing flow, the contents of the table 2*a*, and the operations, when the server 1 delivers email as usual, and adds the address of incoming email to the email message.

FIG. 5A shows the processing performed by the mail accepting unit 3 within the server 1, whereas FIG. 5B exemplifies the contents of the table 2*a* stored in the processing contents storing unit 2.

If the operation for adding a transmission destination is specified as a processing method for the address of incoming email as shown in FIG. 5B, the server 1 delivers the email similar to normal email after adding an address in a format "X-Forwarded-From: address of incoming mail" to a predetermined field in the header.

FIG. 5C schematically illustrates the processing for writing the address of n email transmitter to a header 6a of email 6 in the above described format, and for transmitting the email 6 to a client at the transmission destination.

As shown in FIG. 5A, upon receipt of email, the mail accepting unit 3 within the server 1 makes a matching between the address of the transmitter of the email and the addresses or the address patterns registered to the table 2a shown in FIG. 5B. If they mismatch, the mail accepting unit 3 performs normal mail processing. If they match, the mail accepting unit 3 determines a processing method by referencing the processing method and the option fields in the matching line within the table 2a. In this case, the processing method is "adding a transmission destination", and no specification is made in the option field. Therefore, the mail accepting unit 3 adds the above described message to a predetermined portion such as an email header, etc., and transmits the email to a client. The client can destroy or receive the email after viewing the address of the transmitter described in the predetermined portion of the received email. It is also possible to install on a client side a program which automatically determines whether or not to destroy the email by referencing a transmitter address, and executes the corresponding processing.

In the example shown in FIG. 5C, "X-Forwarded-From: ueda.xxx.xxx@fuji" is added to the header 6a of the email 6. For a specific adding method, please see the documents cited in the explanation of the conventional techniques. Their detailed explanations are therefore omitted here.

FIGS. 6A, 6B, 7A, and 7B exemplify the processing flow and the registration of a processing method, when the server 1 determines whether or not incoming email has a particular property, and specifies a mail processing method according to the result of the determination.

When this processing method is specified, the description of a property to be determined, and a processing method which varies depending on whether or not the email has the property are registered to the table 2a within the processing method storing unit 2. The property to be determined, and the processing method which varies depending on whether or not the email has the property are stored in the table 2a as options. Or, the behavior of the server 1 may be partially fixed. That is, the server 1 destroys the email having the property without performing no operations, and writes the transmitter address to the email if the email does not have the property. In a processing method field, only a property may be specified, and specific processing may be stored in the server 1 as an option.

As to properties to be determined, various types may be considered. Pattern matching of each information type about email, for example, whether or not a subject includes a particular character string, whether or not a transmission date is within a predetermined time period, whether or not a message text includes a particular character string, etc. may be considered.

Figures 6A, 6B:
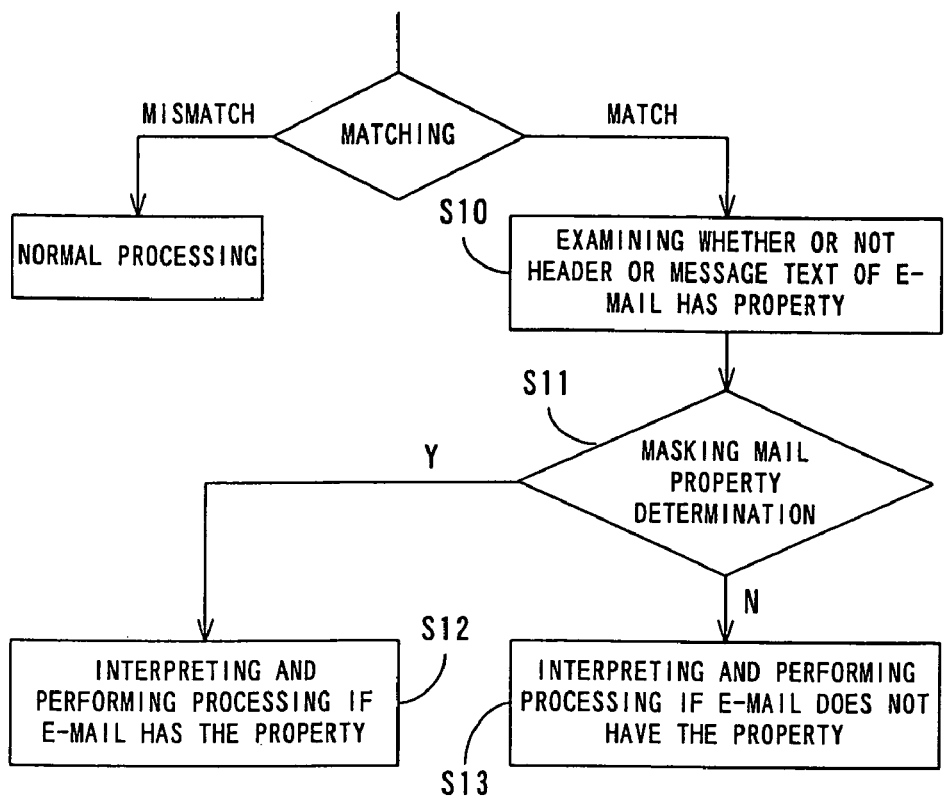
FIGS. 6A and 6B exemplify the processing for determining whether or not incoming email has a particular property, and for specifying the email processing method according to the result of the determination, and the registration of the processing method (No. 1)
Figures 7A, 7B:
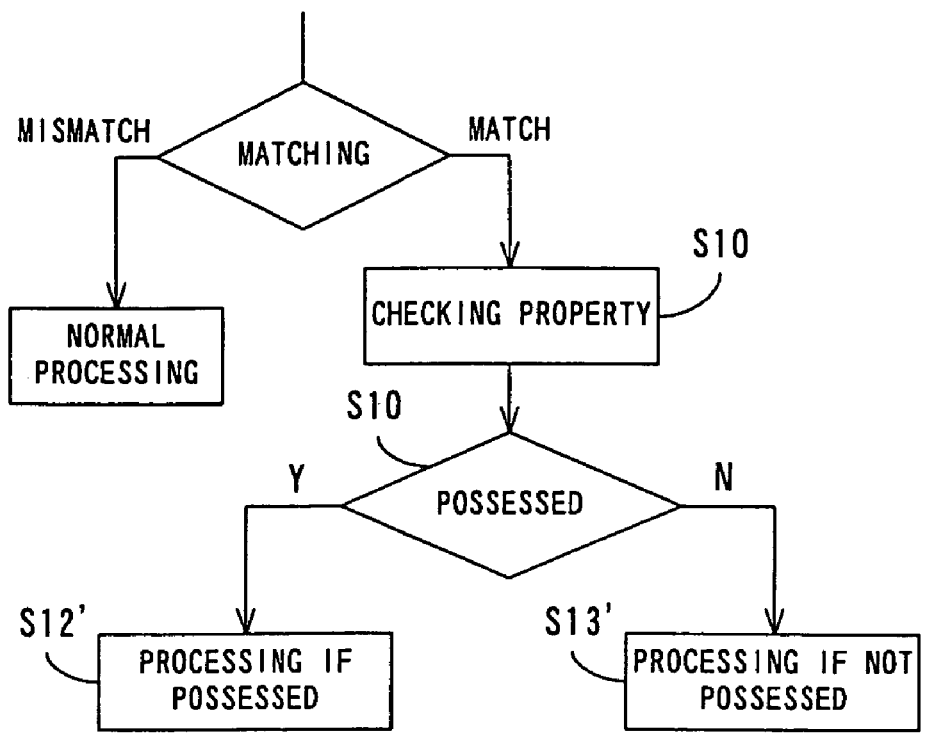
FIGS. 7A and 7B exemplify the processing for determining whether or not incoming email has a particular property, and for specifying the email processing method according to the result of the determination, and the registration of the processing method (No. 2)

When email reaches the address corresponding to this processing method, the mail accepting unit 3 within the server 1 extracts the property to be determined in correspondence with its address, examines whether or not the email has a particular property (step S10: FIGS. 6A and 7A), and determines whether or not the email has the particular property (step S11: FIGS. 6A and 7A). The server 1 extracts the corresponding processing from the option field in the table 2a within the processing method storing unit 2 or from a fixed information storing region within the server 1, and performs the corresponding processing, if the email has the property (steps S12 and S12'), or if the email does not have the property (steps S13 and S13'). This processing method may be any of the above described processing methods. Some restrictions may be imposed depending on the type of the server 1. Or processing to be described later may be used.

FIGS. 8A through 8C and 9A through 9C exemplify the processing flow of the server 1 and the data stored in the server 1, when a processing method is encrypted and buried in an arbitrary character string included in a mail address, and the server 1 interprets and executes the encrypted method.

Figure 9A:
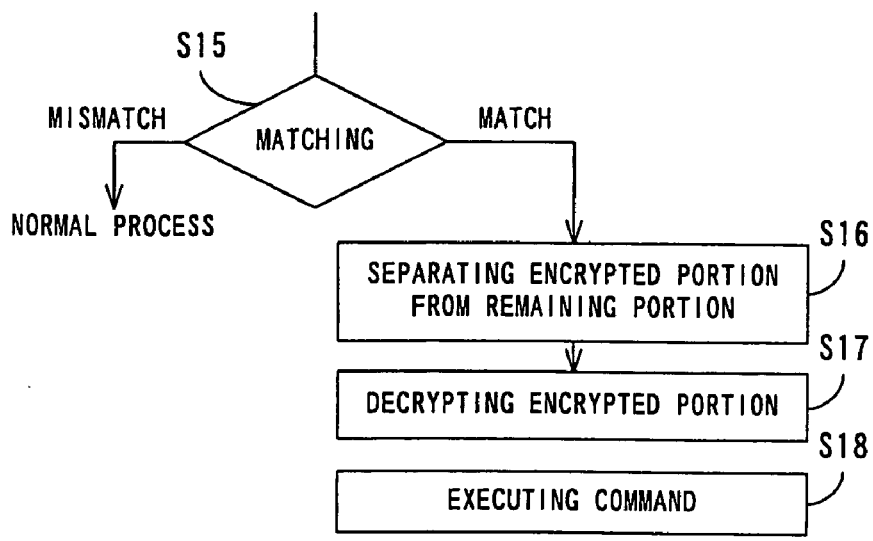
FIGS. 9A through 9C show the processing of the server and stored data, when a processing method is encrypted and buried in an arbitrary character sting in an email address, and the server interprets the encrypted characters and executes the method (No. 2)
Figure 9B:

FIGS. 8A and 9A show the processing flow of the server 1. FIG. 8B shows a table 4 for storing a decryption key. FIGS. 8C, 9B, and 9 exemplify the contents of the table 2a within the processing method storing unit 2.

A user registers a decryption key to the server 1 before specifying this processing method. The key may be specified for each user according to the type of the server 1 (see FIG. 8B), or may be changed for each address pattern. That is, the decryption key is stored as an option for each user in the former case (as shown in FIG. 8B), whereas the key is stored as an option for a processing method in the latter case (as shown in FIG. 8C).

Figure 9C:

Furthermore, if a user specifies this processing method, he or she specifies the pattern for extracting an encrypted command portion, which is stored in the table 2a within the server 1 as an option, a portion of an address pattern, a portion of an option or a processing method (as shown in FIGS. 9B and 9C).

A user represents the command to be executed when notifying an email address as a character string that can be interpreted by the server 1, and then encrypts the character string. Then, the user puts the encrypted command and the processing method into a form which is suitable for a specified address pattern, adds them to an arbitrary character string portion in an email address, and finally creates the email address. Then, the user notifies the server 1 of the created email address.

When email reaches the address corresponding to this processing method (if a matching address is found as a result of the address matching in step S15), the mail accepting unit 3 within the server 1 extracts the pattern for extracting an encrypted command portion included in the address, and takes out the encrypted command portion from the address according to the pattern (step S16). Then, the command portion is decrypted by using the key which is prestored in the input/output unit 4 (step S17), and the processing is performed by interpreting the decrypted character string (command) (step S18). The processing may be any of the above described methods, or some restrictions may be imposed depending on a server type. Additionally, advanced processing may be performed in collaboration with a processing system of a suitable programming language (such as Perl) depending on a server type.

The server 1 of FIGS. 5A through 5C always delivers emails to all of mail addresses. For the email having the address preregistered to the table 2a, the server 1 adds the address of the incoming email to the message. It is also possible to endow the server 1 with such a capability, and to accept no instructions from the input/output unit 4. Such a configuration eliminates the need for changing a processing method depending on an email address. Consequently, neither the constituent element for accepting a user specified method nor the complicated processing performed for each address or address pattern becomes unnecessary in the server 1, thereby significantly reducing the load on the server 1.

It is a known technique to correspond an unlimited number of addresses to a single address theoretically, and to deliver emails. A new technique according to the present invention is to cope with junk email by adding the address of incoming email thereto.

In the above provided explanation, the server 1 is made to perform the processing. However, the processing may be performed not on a heavily loaded server side but on a client side so as to obtain the same effect as that by the server 1. Furthermore, it is risky to transmit a cryptographic key in advance via a public communications channel. However, this risk can be eliminated by placing all the information required for the encryption processing, such as a cryptographic key, etc. on a client side.

Figure 10:
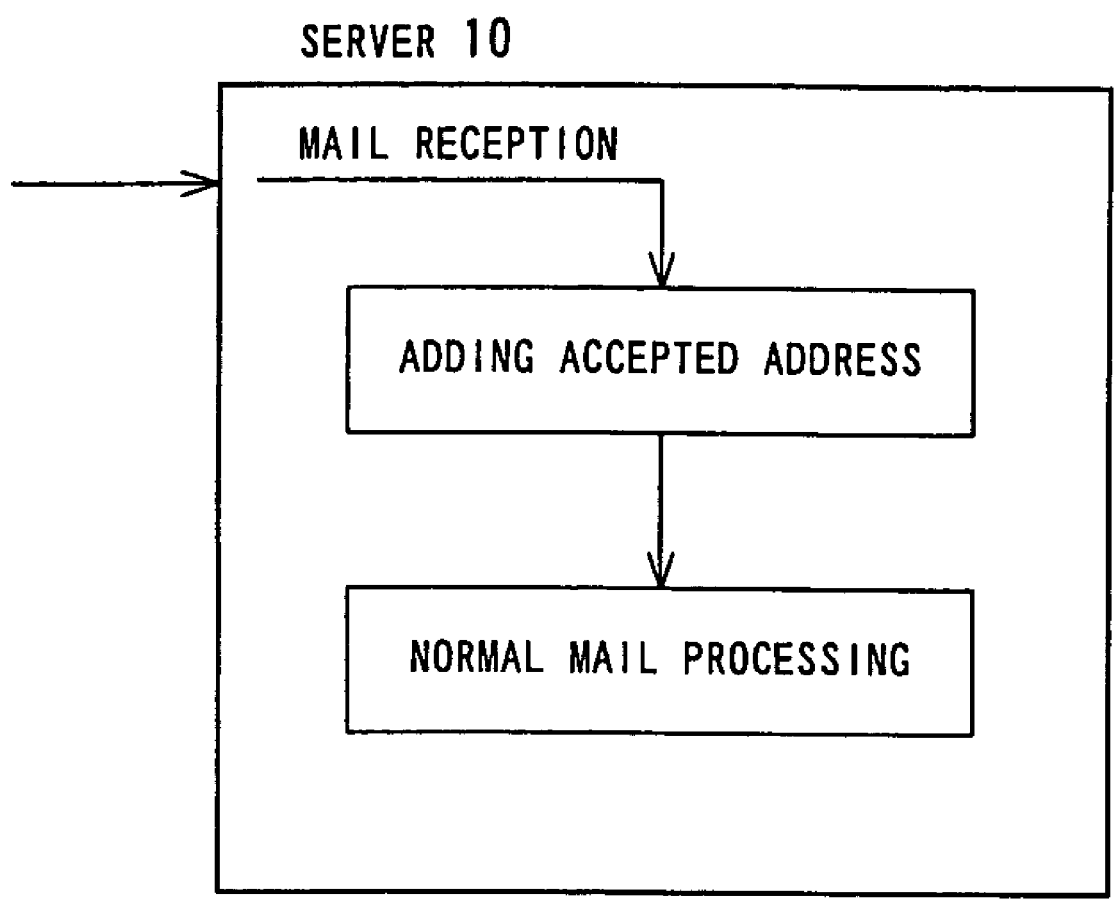
FIG. 10 explains the processing of the server, when a junk email blocking device is arranged in a client.

FIG. 10 explains the processing performed by a server when a junk email blocking device is arranged in a client.

In this case, upon receipt of email, a server 10 performs normal mail processing after registering the address of the email transmitter, for example, to the header of the email. The normal mail processing includes the operations such as delivering received email to a client, or the like.

When the client performs the processing, the operation of "making a delivery similar to that of normal email", which is performed by the server, is replaced with an operation of "making a display similar to that of normal email". The processing is then performed on the client side.

Figure 11:
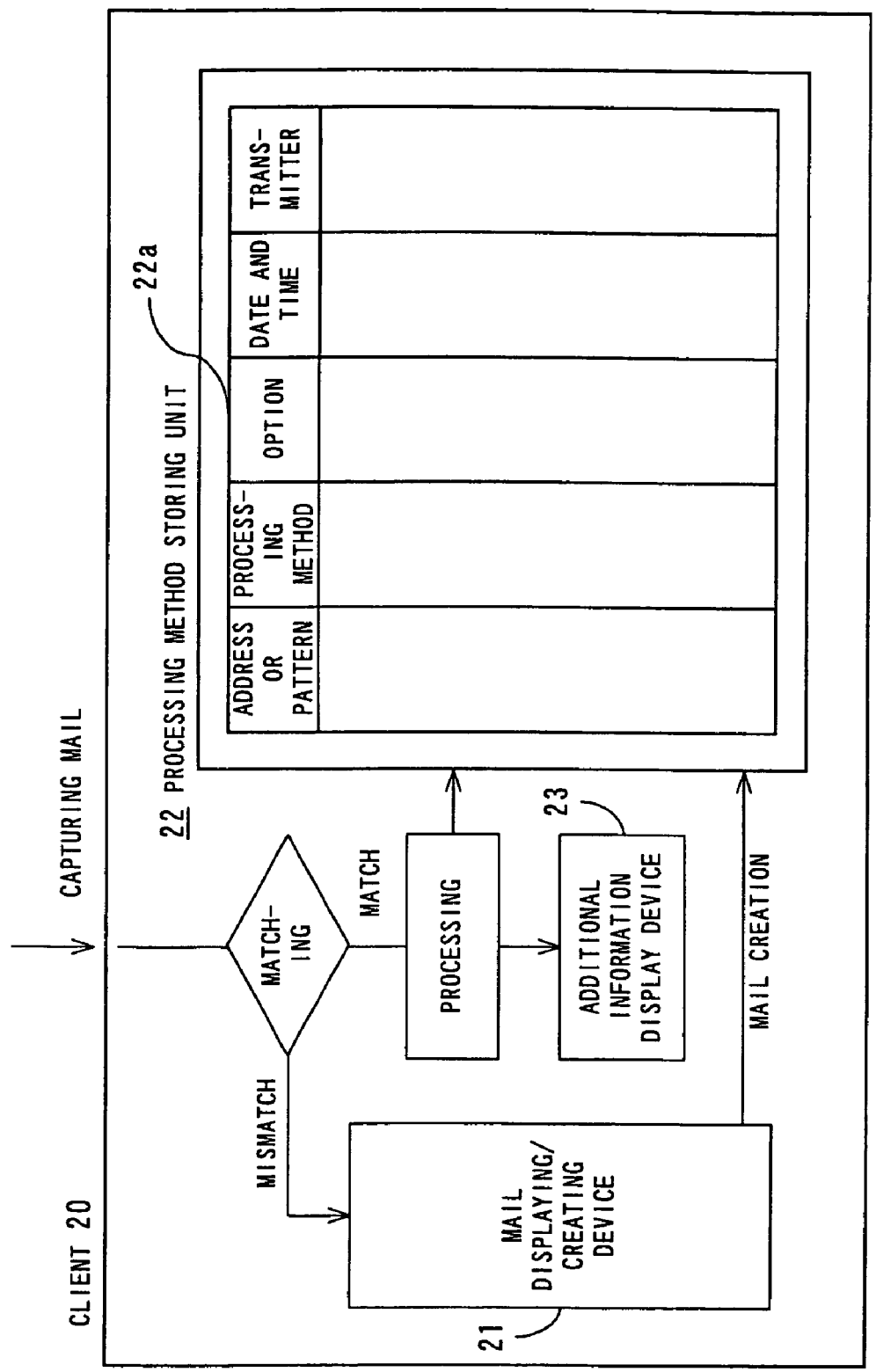
FIG. 11 shows the configuration of the client, when the client processes junk email.

FIG. 11 shows the configuration of a client, when junk email processing is performed on the client side.

First of all, upon capturing email, a client 20 examines its address, and determines whether or not the address matches the addresses or the address patterns stored in a table 22a within a processing method storing unit 22. If they mismatch, the client 20 displays the email on a mail displaying/creating device 21. If the addresses match as a result of the determination, the client 20 performs processing similar to that by the above described server 1 by referencing the fields such as the processing method field, the option field, etc. in the table 22 within the processing method storing unit 22. When creating email, a user creates the email by using the mail displaying/creating device 21. When transmitting the email to a partner registered to the table 22a by referencing the table 22a within the processing method storing unit 22 in this case, the client 20 performs the processing for notifying the transmission partner of the address including an encrypted pattern.

Furthermore, an address of the client 20 itself, which is issued when a partner transmits email to the client 20, is registered in association with additional information items (such as an issue date and time, the partner name, and others), so that also the information items corresponding to the address of incoming mail can be displayed. For this implementation, the client 20 is configured in a way such that a display device 23 displaying additional information is arranged, and at the same time, a date and time, a partner name, etc. are registered to the table 22a within the processing method storing unit 22 in correspondence with each address or address pattern. As a result, from which partner an email address is leaked can be tracked with ease after a spam harm occurrence.

Furthermore, the issued address is registered in association with a corresponding partner as an additional capability of the client 20, so that the client which automatically uses the registered address as a transmitter address when transmitting email to such a partner, can be implemented.

For this implementation, the client 20 is configured in a way such that not a pattern but a particular address is registered to an address part (address field) in the table 22a within the processing method storing unit 22, and a mail address (sequence) issued to a desired partner (partners) is stored as an option in the table 22a.

When email is created, an address pattern, which covers a partner having the address matching the address of a desired recipient, is searched in the table 22a. If such an address pattern is found, it is used as a transmitter address. When the email is transmitted to a plurality of partners, an address pattern which covers all of the partners is searched in the table 22a.

If such an address pattern is not found, a desired recipient is a new partner (or its combination). Therefore, a user is made to select any of the following operations 1) through 3), or a system selects and performs any of 1) through 3) in a fixed manner.

1) Using a default address.

2) Using any of existing address patterns.

3) Creating a new address, and making an association between the created address and a new partner.

When the operation 2) is performed, (all of) partners can be registered to the table 22a as partners corresponding to a single address pattern.

Additionally, email transmitted from partners other than a desired partner may be separately processed. In this case, as separate operations, an operation specified in the option part (option field) in the table 22a within the processing method storing unit 22, an operation fixed by the client 20 (such as discarding the email), or the like may be considered.

Figure 12:
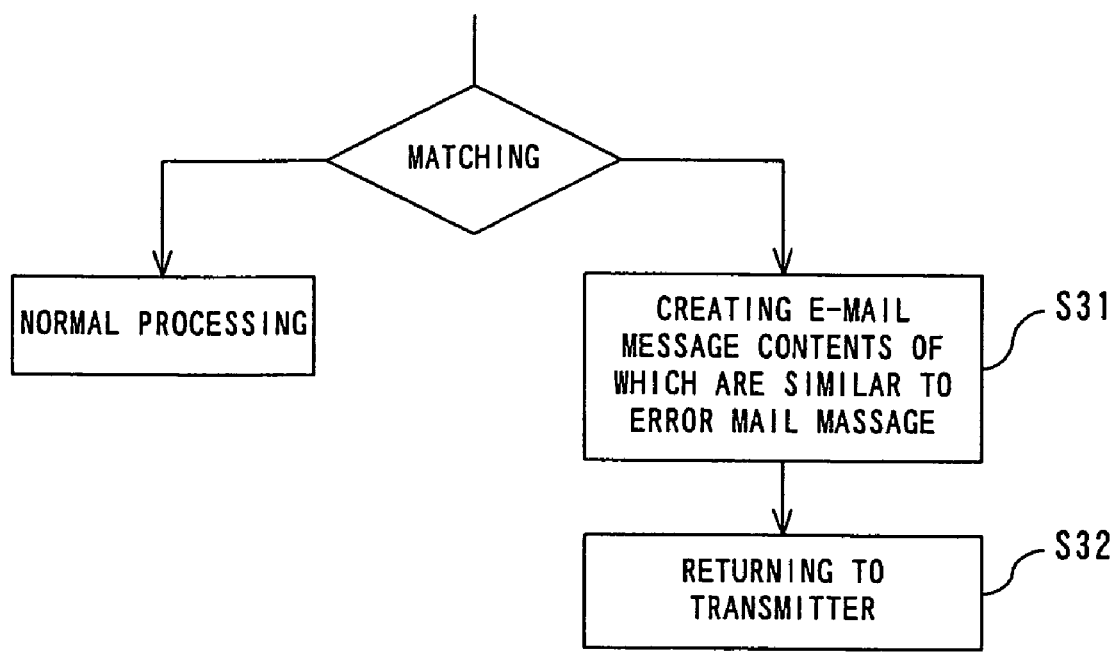
FIG. 12 shows the processing for creating a mail error message the contents of which are similar to those of an error mail message, and for returning the created mail message to a transmitter.

Or, as shown in FIG. 12, the client 20 may create a mail message the content of which is similar to an error mail message (step S31), and return the created mail to a corresponding partner.

Hereinafter, a specific example of the capabilities of the server 1 when junk email is processed on the server 1 side.

The server 1 internally holds a list of registered processing methods (please see the processing contents storing unit 2 shown in FIG. 1A and the table 2a shown in FIG. 1B). The processing method list is an information list composed of a set of an address part (address or address pattern), a processing method, and an option part. The address part is assumed to be represented by a pattern using a normal representation. When a match with a particular address is desired, a wildcard character is not used. If a match with all addresses is desired, a pattern [user name.*] is used.

Note that, however, the following restrictions are assumed to be imposed.

In the case shown in FIG. 4, a mark can be put only on a mail header, and a character string to be added to the header is registered as the mark.

In the case shown in FIG. 6A, 6B or 7A, 7B, a property to be determined is assumed to be a matching pattern using a normal representation in a mail header, a header field name to be examined, or a matching pattern (normal representation). The contents of the processing performed depending on whether or not a match is found can be recursively specified. In this case, also the option part for the recursive processing contents can be specified at the same time.

A cryptographic key in the case shown in FIG. 8A, 8B or 9A, 9B may differ depending on each processing method, and is stored in the option part in the table 2a within the processing contents storing unit 2. Additionally, a pair of parentheses is inserted in the address part in the table 2a, and the portion enclosed by the parentheses is assumed to be handled as an encrypted command. The server 1 is configured to call a subprogram (a mail processing program) by interpreting and executing the encrypted command.

The server 1 is assumed to handle emails reaching all of mail addresses represented by [user. arbitrary character string@server.domain] as emails reaching a mail address [user@server.domain], upon receipt of the emails.

Upon receiving the email, the server 1 stores a destination address as a destination, and a character string on the left side of "@" as an extended user name. Furthermore, the server 1 extracts a character string on the left side of "." which exists leftmost in the extended user name, and stores the extracted string as a user name. If a mail address does not include ".", the server 1 stores as a user name the same character string as an extended user name.

Next, the server 1 sequentially makes a matching between the extended user name and each address part in a processing method list, and determines whether or not they match.

If they mismatch, the server 1 handles the email as mail addressed to [user name@server.com], and performs normal delivery processing.

If they match, the server 1 processes the email according to the processing method and the option described in the corresponding fields.

<Algorithm for a Mail Processing Subprogram>

A calling format for a mail processing subprogram is as follows (within parentheses, parameters are included).

subprogram: Processing email (a processing method, an option, mail, an extended user name, a user name, and a destination)

The capabilities of the mail processing subprogram are listed below.

If a processing method is "mail", email is recognized as mail addressed to [user name@server.com], and normal delivery processing is performed.

If the processing method is "dispose", email is simply discarded and the processing is terminated.

If the processing method is "error", control is transferred to an error mail message transmission routine in normal processing, which is executed when an address is unknown, and the error mail message is transmitted by executing this routine.

If the processing method is "header", a marked character string is added to the header of email, the email is recognized as mail addressed to [user name@server.com], and normal delivery processing is performed.

If the processing method is "mark", a character string "X-forwarded-from:destination" is added to the header of email, the email is handled as mail addressed to "user name@server.com", and normal delivery processing is performed.

If the processing method is "if", the option part is recognized to be a character string where the following items are linked.

A property which is enclosed by ( ) and is to be examined.

A processing method and an option, which are enclosed by { }, if the above described property is possessed.

A processing method and an option, which are enclosed by { }, if the above described property is not possessed.

The property to be examined is defined to be any of the following items, or an arbitrary number of the following items, which are concatenated by && or or enclosed by a pair of ( ).

field name: acceptable pattern field name! unacceptable pattern date before a specified date date after a specified date Note that patterns must be normal representations.

A field name is a field name in a mail header, such as "From" or "Subject".

A processing method and an option must be delimited by an empty space and arranged side by side. The processing method must be the one that can be executed by a mail processing subprogram. If there is no option, an empty space may be omitted.

First of all, the property to be examined is extracted from the character string formatted as described above in the option part, and the header of the incoming email is examined according to the extracted property.

If the property to be examined is [field name: acceptable pattern], content of the field name is extracted from the email. Only if the extracted content matches the acceptable pattern, it becomes true. Otherwise, it becomes false.

If the property to be examined is [field name! unacceptable pattern], content of the field name is extracted from the email. Only if the extracted content mismatches an acceptable pattern, it becomes true. Otherwise, it becomes false.

If the property to be examined is [date after a specified date], the Date field of the email is interpreted, and besides, the date in the specified date portion is interpreted. Only if the date in the Date field is later than the specified date, it becomes true. Otherwise, it becomes false.

If the property to be examined is [date before a specified date], the Date field of the email is interpreted, and besides, the date in the specified date portion is interpreted. Only if the date in the Date field is earlier than the specified date, it becomes true. Otherwise, it becomes false.

If the property to be examined is concatenated by && or || or enclosed by ( ), the property is examined by making a calculation in a way such that && (a logical AND) takes precedence over || (a logical OR), and ( ) is given the highest precedence.

Next, either of two processing methods is selected depending on whether the examination result is either true or false. A portion from a processing method till an initial empty space is recognized as a processing method, and the remaining portion is recognized as an option. Then, the mail processing subprogram is recursively called.

For example, the following description can be made in the option part.

(Subject:.Hello.*&&From!friendname@some.domain)[If (From:spammer)[error][header greeting:true]][mail]

In this case, if "Subject" of the email includes Hello, and if the portion starting with "From" does not include Friend_name@some.domain, the portion starting with "if" is recognized as a processing method, and the processing of "if" is recursively performed. In other cases, normal mail delivery processing is performed.

If the processing method is "decrypt", a character string matching the portion enclosed by parentheses in an address pattern part is first extracted, and the extracted character string is recognized as an "encrypted command". Next, a cryptographic key is extracted from an option part, and the encrypted command is decrypted by using this key. In the obtained character string, the portion up to the first empty space is recognized as a processing method, and the remaining portion is recognized as an option. Then, the mail processing subprogram is recursively called.

<Registration/Reference of a Processing Method List>

Furthermore, the server 1 comprises a unit registering/referencing a processing method list (an input/output unit 4 shown in FIG. 1A). If a request to reference the processing method list is issued from a user, the server 1 presents to the user a list (including address patterns and options) of processing methods corresponding to a user name, that is, all of the processing methods having the address "user name" or a pattern starting with "user name."

As processing method registration, the following registration operations can be performed.

Deleting previous registration.

Changing the order of a registered processing method (in which order a corresponding pattern is examined).

Changing registered contents.

Making new registration.

<Registration of a Processing Method>

The server 1 receives an address name, a command (that can be interpreted by the server 1 itself), and a command option, and adds them to the processing method list (the table 2a within the processing contents storing unit 2 in FIG. 1A) registered by a user.

Specific Example add address command name [option]

As a command name, any of "dispose", "error", "mark", "header", "if", "decrypt", and "mail" is used.

An address, a command name, and an option are delimited by an empty space. The server 1 separates them, and stores the separated character strings as the processing method list registered by a user in the table 2a.

If the processing method specified by a user currently exists, a new method is appended to the end of the list.

"dispose", "error", and "header" have no options.

Since the "mark" command has an added header name as an option, the server 1 accepts the following command.

add address mark header name header contents (For example, add ueda.broadcast mark X-Possibly-Spam: true)

The server 1 concatenates the header name (X-Possibly:), and the header contents (true) as a character string, and handles the string as an option part.

The "if" command provides checking contents and operations after checking as options. An option character string must have a syntax that can be accepted by an option part of a mail processing subprogram.

Contents of the operations performed at the time of a mismatch can be omitted. In this case, the "error" command is assumed to be specified by default, and this command is added to an option character string, which is stored in the table 2a. Also contents of the operations performed at the time of a match can be omitted. In this case, the "mail" command is assumed to be specified by default, and an option character string to which the "mail" command is added is stored in the table 2a. Note that, however, the contents of the operations at the time of a match cannot be omitted if the operations at the time of a mismatch are specified.

The syntax when being registered is a combination of the "add" command and an option.

Commands that the server 1 receives are, for example, as follows.

add ueda.from.friends if (From:friend1 @his.domain | From:friend2@her.domain)

add ueda. 1 month.from.990401 if (date before 1999/5/1) {mail} {error} add ueda.report if (Subject:.*bug.*report*) {if(From:customer1 | From: customer2) {mark X-customer-report : yes} {mark X-bug-report:yes}} {mail}

The server 1 receives these commands, and adds all of the character strings in the option parts as user specification.

The "decrypt" command specifies a pattern including a compoundable portion enclosed by \ (\) in an address pattern. Additionally, a decryption key is received as an option.

Unlike a usual representation, "." and "*" are used as wildcards only if they are escaped by \.

The command that the server 1 receives is, for example, as follows.

add ueda.commandkey1.\(\.\*\) decrypt Nsa0ghzaldvaJAgalAsfD034J

The decrypted character string is a character string where the "add" command and an option are combined.

<Reference of Processed Contents>

When a user name is provided to the server 1, the server 1 returns a registered processing list.

Specific Example show user name

If this is transmitted to the server 1, the server 1 returns the entire contents of the list of registered processing methods starting with "user name." in text.

The returned contents are defined to be the syntax when being registered, from which "add" is excluded, that is, the format from the address pattern in the format.

<Deletion of Processed Contents>

Providing an address pattern, searching for a pattern the contents of which are exactly the same s those of the provided pattern, and deleting a corresponding item from a list. If no pattern is found, an error is returned.

Specific Example delete pattern If an item that perfectly matches the provided pattern exists within the table 2a, the matching item is deleted from the table 2a, and the contents before being deleted are returned in text, similar to "show".

<Change in Processed Contents>

Providing an address pattern, and a command being the changed contents therein (and its option), and replacing a currently registered processing method with this pattern.

Specific Example replace pattern command name[option]

The syntax is exactly the same as the "add" command. If an item that perfectly matches the provided pattern exists, the command and the option of that item are replaced with the command name and the option, which are specified by change processing. Then, the information before being replaced is returned in text, similar to "delete". If the specified pattern is not found, exactly the same operations as those of "add" are performed, and a warning such that the original pattern is not found is returned in text.

<Order Rearrangement Operation in the Change Processing>

Specifying an address pattern and an order of examining the pattern, and moving the pattern according to the specified order.

Specific Example order pattern order

If an item that perfectly matches the specified pattern, the order of the specified list s changed so that the matching item is examined according to the specified order counted from the beginning. This change moves the order of the subsequent examinations backward by one. If no matching item is found, the error message such that the patter is not found is returned in text.

<Mail Address Creating Unit (an Independent Program on the Client 20)>

Figure 13:
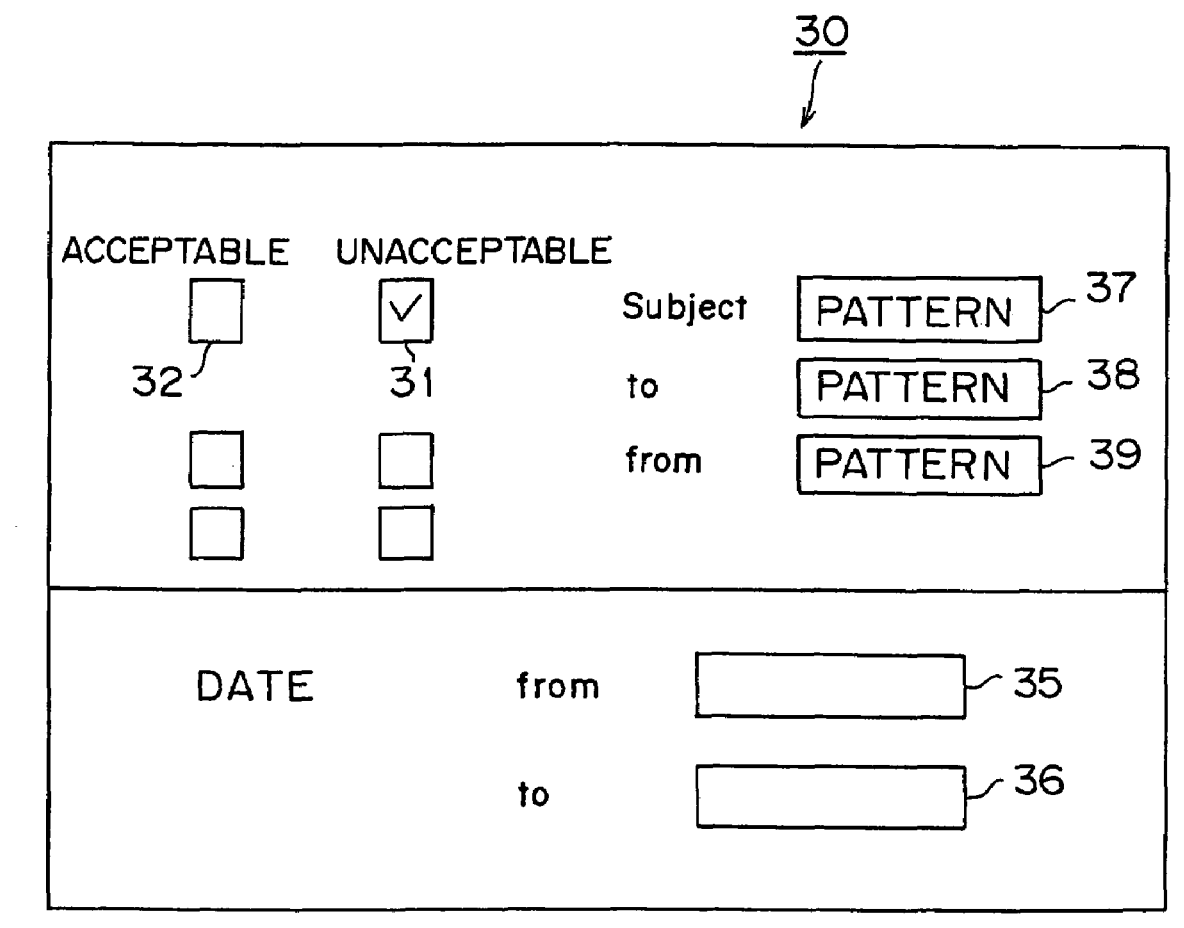

If encryption is made at the time of email creation, a client 20 program inquires of a user as to a field name or date to be checked. FIG. 13 exemplifies the format of a user interface screen 30 on which the client 20 program inquires of a user as to a field name or a date.

If an unacceptable button 31 is checked, field name! pattern && if an acceptable button 32 is checked, field name: pattern && if an input is made to a Date "from" field 35, Date from a specified date if an input is made to a Date "to" field 3, Date after a specified date are concatenated as a character string and used as a command.

For "Subject", "to", and "from", patterns 37 to 39 are respectively used.

<Combination of a Server and a Client>

The above provided explanation assumes that the server 1 processes junk email. However, the client 20 side may process junk email as described above. In this case, the server 10 shown in FIG. 10 can be combined with the client 20, for example, shown in FIG. 11, which has the capabilities of the server 1 shown in FIGS. 2 to 9.

Upon receipt of email, the server 10 examines the character string on the left side of "@" in the address of the email, and performs normal deliver processing (including an mail error message transmission when a user name is unknown), if [.] is not included in the address. If [.] is included, the server 10 stores the destination address as a destination. Furthermore, the server 10 extracts the character string on the left side of the leftmost [.], and stores the extracted string as a user name.

Then, the server 10 adds to the header of the received email, for example, the character string "X-Forwarded-From: destination", and performs normal delivery processing by recognizing the email as the mail addressed to [user name@server.com]. The portion "X-Forwarded-From" may be changed to an arbitrary character string if it can be processed by the client.

A mail displaying/creating device 21 within the client 20 (see FIG. 11) is assumed to comprise a processing method list in a similar manner as in the above described example. However, it is supposed that the mail displaying/creating device 21 within the client 20 can store auxiliary information about each registered address (such as an initially registered date and time, an email partner, memos, etc.) or an address used as a partner. It is also supposed that this device can display email, store the email in a folder, or destroy or create (transmit) the email as normal processing.

Upon receipt of the email from the server 10, the client 20 pays attention to its header "X-Forwarded-From: destination", and performs processing similar to the above described example by using the destination. For the "normal delivery" processing performed by the above described server, the client 20 is assumed to display the email or store it in a folder as a portion of normal delivery processing.

For an error mail message delivery, a client does not comprise a unit having such a capability in normal cases. Therefore, the client is assumed to internally store a standard error mail message format, and to transmit an error mail message by using this format.

Additionally, the client 20 comprises a unit registering/referencing a processing method list (a unit which is not shown and corresponds to the input/output unit 4 shown in FIG. 1A). When a request to reference a processing method list (contents registered to the table 22a stored in the processing method storing unit 22) is issued from a user, the client 20 presents the list of all processing methods (including address patterns, options and auxiliary information) to the user.

As processing method registration, the following registration operations can be performed.

Deleting previous registration.

Changing the order of a registered processing method (in which order a corresponding pattern is examined)

Changing registered contents.

Making new registration.

Furthermore, the client 20 can use an address pattern as a transmitter address, when the transmitter address corresponding to the address pattern including no wildcard character is registered in a processing method, this address pattern is used as the transmitter address.

To implement this, an address pattern which covers a desired partner having the address matching the transmission partner address as the processing method field is searched. If such an address pattern is found, it is used as a transmitter address. When email is simultaneously transmitted to a plurality of partners, an address pattern which covers all of the partners having the addresses matching the corresponding partners is searched.

If such an address pattern is not found, it is a new partner (or a combination of new partners). Therefore, a user is made to select any of the following operations.

1) Using a default address.

2) Using any of existing address patterns.

3) Creating a new address, and making an association between the new address and a new partner.

When the operation of 2) is performed, whether or not (all of) partners are registered as the corresponding partners of the address pattern is further inquired of the user, which eliminates the need for repeating the same operations at the time of email transmission thereafter.

As described above, according to the present invention, a server side delivers emails having an unlimited or a huge number of mail addresses is delivered to one mailbox with an easy method, and e-mail transmitted from unexpected transmitters can be determined with ease by creating a disposable mail address, a mail address dedicated to a particular partner, or a mail address including encrypted information which can be understood only by a recipient.

As a result, it becomes possible to easily delete junk or advertisement email, which is referred to as spam, and to receive only desired email.

Additionally, such a capability is implemented by combining a client and a server, whereby this capability can be easily realized also in a server having a currently distributed framework without making almost no modification of the server.

Furthermore, server or client software can easily delete spam mail, and at the same time, necessary mail is never be deleted.

What is claimed is:

1. A device for routing junk email, comprising:

a mail address extracting unit extracting a mail address indicating a destination from received email;

a storing unit registering a plurality of processing methods available for processing the received email and corresponding destination mail addresses or destination address patterns; and a mail processing unit matching the mail address indicating the destination of the received email with one of the corresponding destination mail addresses or destination address patterns registered in said storing unit, and processing the received email based on a processing method obtained as a result of the matching, including sending a delivery-error email message back to a sender of the received email stating that no receiver has been found at the destination of the received email when a character string in the mail address matches a predetermined character string designated for the destination.

2. The device according to claim 1, further comprising a specifying unit to specify use of one of the processing methods for email having a particular property.

3. The device according to claim 1, further comprising a unit to interpret an encrypted processing method for use as the processing method.

4. A method for routing junk emails, comprising:

extracting a mail address indicating a destination from received email;

registering a plurality of processing methods available for processing the received email and corresponding destination mail addresses or address patterns; and matching the mail address indicating the destination of the received email with one of the corresponding the destination mail addresses or the destination address patterns registered previously; and processing the received email based on a processing method obtained as a result of the matching, including sending a delivery-error email message back to a sender of the received email stating that no receiver has been found at the destination of the received email when a character string in the mail address matches a predetermined character string designated for the destination.

5. The method according to claim 4, further comprising specifying use of one of the processing methods for email having a particular property.

6. The method according to claim 4, further comprising interpreting an encrypted processing method for use as the processing method.

7. A computer-readable storage medium on which is recorded a program for causing a computer to perform a process, said process comprising:

extracting a mail address indicating a destination from received email;

registering a plurality of processing methods available for processing the received email and corresponding destination mail addresses or destination address patterns; and matching the mail address indicating the destination of the received email with one of the corresponding Destination mail addresses or the destination address patterns registered previously; and processing the received email based on a processing method obtained as a result of the matching, including sending a delivery-error email message back to a sender of the received email stating that no receiver has been found at the destination of the received email when a character string in the mail address matches a predetermined character string designated for the destination.

* * * * *